(12) United States Patent
Hsia

(10) Patent No.: US 10,390,395 B1
(45) Date of Patent: Aug. 20, 2019

(54) SOLID-STATE LIGHTING WITH A BATTERY BACKUP CONTROL

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 16/401,849

(22) Filed: May 2, 2019

Related U.S. Application Data

(63) Continuation-in-part of application No. 16/296,864, filed on Mar. 8, 2019, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No.

(Continued)

(51) Int. Cl.
| | |
|---|---|
| *H05B 33/08* | (2006.01) |
| *F21V 23/02* | (2006.01) |
| *F21S 9/02* | (2006.01) |
| *H02M 1/44* | (2007.01) |
| *H02M 3/24* | (2006.01) |
| *H02J 7/00* | (2006.01) |
| *H02J 9/06* | (2006.01) |
| *H02M 1/42* | (2007.01) |
| *F21Y 115/10* | (2016.01) |

(52) U.S. Cl.
CPC ............ *H05B 33/0815* (2013.01); *F21S 9/02* (2013.01); *F21V 23/02* (2013.01); *H02J 7/0072* (2013.01); *H02J 9/061* (2013.01); *H02M 1/4208* (2013.01); *H02M 1/44* (2013.01); *H02M 3/24* (2013.01); *F21Y 2115/10* (2016.08)

(58) Field of Classification Search
None
See application file for complete search history.

(56) References Cited

U.S. PATENT DOCUMENTS

| 6,456,511 B1 * | 9/2002 | Wong | H02M 1/36 363/21.13 |
|---|---|---|---|
| 2008/0174276 A1 * | 7/2008 | Takahashi | H02J 9/061 320/128 |

(Continued)

*Primary Examiner* — Minh D A
*Assistant Examiner* — James H Cho
(74) *Attorney, Agent, or Firm* — Han IP PLLC; Andy M. Han

(57) ABSTRACT

An LED luminaire comprises a rechargeable battery, LED array(s), at least two drivers, a battery charging circuit, and a detection and control circuit. The LED luminaire may be used to replace a fluorescent or a conventional LED lamp connected to AC mains. The at least two drivers comprise a power switching driver and a constant current driver. The power switching driver is configured to power the LED array(s) and the battery charging circuit whereas the constant current driver is configured to convert a battery terminal voltage from the rechargeable battery to a DC voltage to light up the LED array(s) when a line voltage from the AC mains is unavailable. The detection and control circuit is configured to disable the constant current driver when the line voltage from the AC mains is available or to enable the constant current driver when the line voltage from the AC mains is unavailable.

16 Claims, 3 Drawing Sheets

Related U.S. Application Data 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | | |
|---|---|---|---|---|
| 2010/0171469 | A1* | 7/2010 | Ju | H02J 7/0072 320/163 |
| 2017/0310160 | A1* | 10/2017 | Wan | F21V 3/062 |

* cited by examiner

SOLID-STATE LIGHTING WITH A BATTERY BACKUP CONTROL

CROSS-REFERENCE TO RELATED APPLICATIONS

The present disclosure is part of a continuation-in-part (CIP) application of U.S. patent application Ser. No. 16/296,864, filed 8 Mar. 2019, which is part of CIP application of U.S. patent application Ser. No. 16/269,510, filed 6 Feb. 2019, which is part of CIP application of U.S. patent application Ser. No. 16/247,456, filed 14 Jan. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaires and more particularly to an LED luminaire with a battery backup control for operations with a line voltage from alternate-current (AC) mains or a battery terminal voltage from a rechargeable battery without ambiguity.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Furthermore, the AC mains-operable LED lamps can easily be used with emergency lighting, which is especially important in this consumerism era. The emergency lighting systems in retail sales and assembly areas with an occupancy load of 100 or more are required by codes in many cities. Occupational Safety and Health Administration (OSHA) requires that a building's exit paths be properly and automatically lighted at least ninety minutes of illumination at a minimum of 10.8 lux so that an employee with normal vision can see along the exit route after the building power becomes unavailable. This means that emergency egress lighting must operate reliably and effectively during low visibility evacuations. To ensure reliability and effectiveness of backup lighting, building owners should abide by the National Fire Protection Association's (NFPA) emergency egress light requirements that emphasize performance, operation, power source, and testing. OSHA requires most commercial buildings to adhere to the NFPA standards or a significant fine. Meeting OSHA requirements takes time and investment, but not meeting them could result in fines and even prosecution. If a building has egress lighting problems that constitute code violations, the quickest way to fix is to replace existing lamps with multi-function LED lamps that have an emergency light package integrated with the normal lighting. The code also requires the emergency lights be inspected and tested to ensure they are in proper working conditions at all times. Nevertheless, in the lighting industry, there is another need that the multi-function LED lamps should be lighted up when the line voltage from the AC mains is unavailable, regardless of regulatory compliance requirements such as periodic testing and a switched and a non-switched AC power, two independent power sources, to supply to the multi-function LED lamps. The switched AC power is provided for consumers to use a regular power switch to turn on or off the multi-function LED lamps or luminaires whereas the non-switched AC power is provided for a rechargeable battery associated with the multi-function LED lamps to be charged at all time and discharged for emergency applications during a power outage. Such a regulatory requirement of using two AC power sources from two branch circuits makes not only the multi-function LED lamps or luminaire design a little complicated but also luminaire installations difficult. In this disclosure, a possibility of an LED lamp or an LED luminaire using a battery backup control will be revisited.

SUMMARY

A light-emitting diode (LED) luminaire comprising a full-wave rectifier, a power switching driver, one or more LED arrays, a rechargeable battery, a battery charging circuit, a battery-operated driver, and a detection and control circuit, is used to replace a fluorescent or a conventional LED luminaire in luminaire fixture sockets connected to the AC mains. The LED luminaire auto-selects a line voltage from the AC mains or a DC voltage from a rechargeable battery to operate the one or more LED arrays. The LED luminaire further comprises an input filter configured to suppress electromagnetic interference (EMI) noise. The full-wave rectifier is configured to convert an input AC voltage from the AC mains into a first direct current (DC) voltage.

The power switching driver comprises a transformer having a primary side and a secondary side, which is electrically isolated from the primary side, a power factor correction (PFC) and control circuit, and a first rectifier and a second rectifier on the secondary side. The power switching driver is coupled to the full-wave rectifier via the input filter and configured to convert the first DC voltage into a second DC voltage and a third DC voltage respectively via the first rectifier and the second rectifier. The battery charging circuit comprises a voltage control circuit, a current control circuit, and a first transistor circuit and is configured to receive and to regulate the third DC voltage into a fourth DC voltage to charge the rechargeable battery to a battery terminal voltage. In other words, the power switching driver, the battery-operated driver, and the detection and control circuit are configured to auto-select the line voltage from the AC mains or the battery terminal voltage from the rechargeable battery to operate the one or more LED arrays without ambiguity.

The battery-operated driver comprises an input transistor and a constant current driver and is configured to convert the battery terminal voltage into a fifth DC voltage to operate the one or more LED arrays when the battery-operated driver is enabled. The constant current driver comprises a step-up converter that receives and boosts the battery terminal voltage to the fifth DC voltage greater than a forward voltage of the one or more LED arrays. While the second DC voltage is configured to operate the one or more LED arrays with a full lumen output when the line voltage from the AC mains is available, the fifth DC voltage is configured to operate the one or more LED arrays with a reduced lumen output relative to the full lumen output when the battery-operated driver is enabled.

In the battery charging circuit, the voltage control circuit comprises a first operational amplifier, a first voltage reference, a first voltage divider coupled to the first operational amplifier, and a first diode. The voltage control circuit is configured to partially control a charging current flowing into the rechargeable battery via the first transistor circuit. The current control circuit comprises a second operational amplifier, a second voltage divider coupled to the second operational amplifier, and a second diode. The current control circuit is configured to partially control a charging current flowing into the rechargeable battery via the first transistor circuit. The first transistor circuit comprises a first transistor and a third diode connected in series with the first transistor and is configured to couple to the voltage control circuit and the current control circuit. Specifically, the first transistor circuit is coupled between the third DC voltage and the fourth DC voltage and to regulate a charging current to charge the rechargeable battery.

The detection and control circuit comprises multiple transistor circuits and is configured to enable or disable the battery-operated driver via the input transistor. In order to detect the line voltage from the AC mains for the detection and control circuit, the power switching driver may further comprise a third rectifier configured to generate a sixth DC voltage. In the detection and control circuit, the multiple transistor circuits comprise a second transistor circuit configured to receive the sixth DC voltage and to pull down a control voltage to the input transistor and to disable the constant current driver. That is, when the line voltage from the AC mains is available, the sixth DC voltage is present to disable the constant current driver. The multiple transistor circuits further comprise a third transistor circuit and a fourth transistor circuit. The third transistor circuit and the fourth transistor circuit are coupled between the second transistor circuit and the input transistor and configured to regulate the battery terminal voltage and to deliver to the input transistor. That is, the input transistor is configured to receive the battery terminal voltage and the control voltage from the second transistor circuit to activate the constant current driver when enabled. The third transistor circuit and the fourth transistor circuit comprise at least one Zener diode configured to regulate the battery terminal voltage and to balance out the fourth DC voltage, the sixth DC voltage, and the battery terminal voltage for safe and reliable operations.

The detection and control circuit may further comprise a pair of metal-oxide-semiconductor field-effect transistor (MOSFET) circuits configured to monitor an electric grid and to determine whether the line voltage from the electric grid is available or not. The pair of MOSFET circuits are configured to send out a high-level signal voltage equivalent to an operating voltage of the pair of MOSFET circuits so as to turn off the input transistor and to disable the constant current driver when the line voltage from the electric grid is available. The pair of MOSFET circuits comprise two MOSFETs, a capacitor, at least one resistor, and a third operational amplifier. Whereas the battery terminal voltage may be used to build up two or more internal power supplies, the two MOSFETs and the third operational amplifier are configured to receive the two or more internal power supplies to operate. The third operational amplifier is configured to compare a voltage across the capacitor to a reference voltage and to send out a low-level signal voltage equivalent to a grounding voltage when the line voltage from the electric grid is unavailable. The low-level signal voltage is configured to apply to the second transistor circuit to pull up the control voltage to the input transistor and to enable the constant current driver. The constant current driver comprises a step-up converter with the fifth DC voltage higher than the battery terminal voltage and a forward voltage across the one or more LED arrays to operate the one or more LED arrays without flickering. While the constant current driver further comprises at least one inductor and at least one diode coupled to the one or more LED arrays, the second rectifier is also coupled to the one or more LED arrays. The at least one diode and the second rectifier are configured to avoid voltage crossovers between the second DC voltage and the fifth DC voltage. The detection and control circuit further comprises a switch configured to allow the rechargeable battery to be charged when the line voltage from the AC mains is available or to be discharged so as to operate the battery-operated driver when the line voltage from the AC mains is unavailable.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
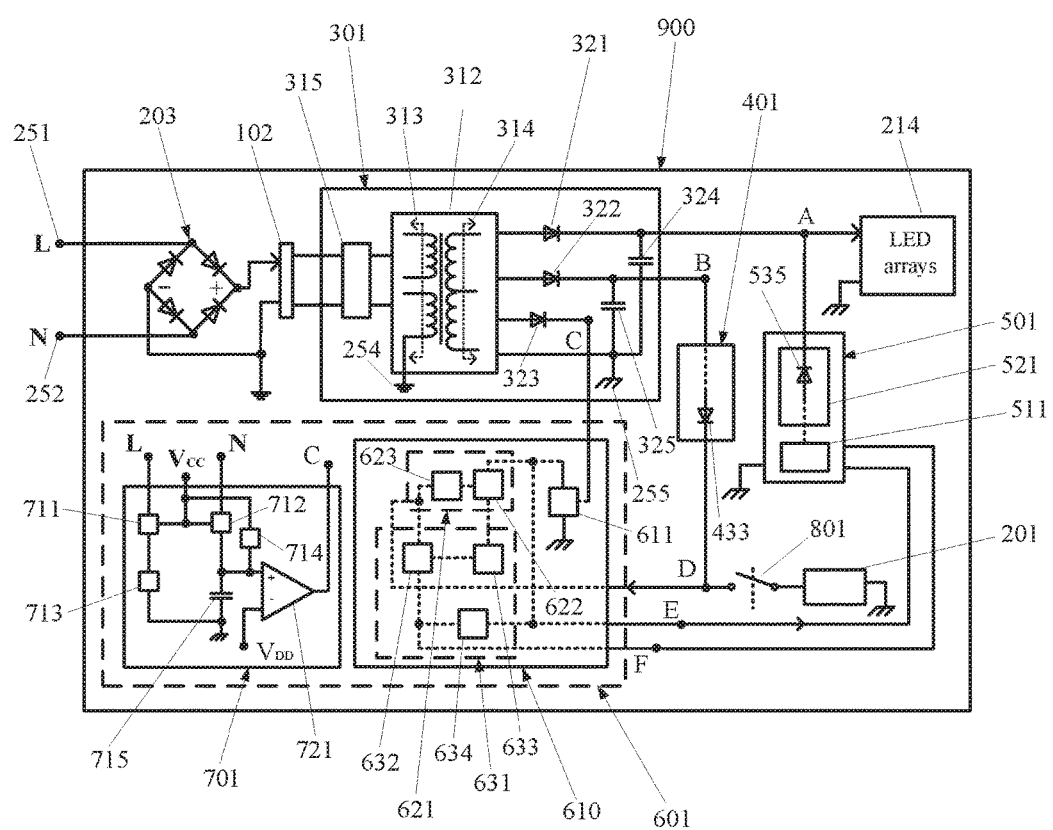
FIG. 1 is a block diagram of an LED luminaire with a battery backup control according to the present disclosure.

FIG. 1 is a block diagram of an LED luminaire 900 with a battery backup control according to the present disclosure. The LED luminaire 900 comprises one or more LED arrays 214, two electrical conductors 251 and 252 connected to "L" and "N" of a line voltage from the AC mains, a full-wave rectifier 203 connected to the two electrical conductors 251 and 252, an input filter 102 configured to suppress EMI noise, a power switching driver 301, a battery charging circuit 401, a battery-operated driver 501, a rechargeable battery 201, a switch 801, and a detection and control circuit 601. The switch 801 is assumed to be closed unless otherwise specified. The full-wave rectifier 203 is configured to convert the line voltage from the AC mains into a first DC voltage.

In FIG. 1, the power switching driver 301 comprises a transformer 312, a power factor correction (PFC) and control circuit 315, a first rectifier 321, a second rectifier 322, and a third rectifier 323. The transformer 312 comprises a primary side 313 and a secondary side 314 respectively coupled to a first ground reference 254 and a second ground reference 255 electrically isolated from the first ground reference 254. Each of the first rectifier 321, the second rectifier 322, and the third rectifier 323 is on the secondary side and connected with a capacitor further connected to the second ground reference 255. For example, the first rectifier 321 is connected with a first capacitor 324 whereas the second rectifier 322 is connected with a second capacitor 325. The third rectifier 323 is connected with another capacitor but not shown in FIG. 1 for clarity. The power switching driver 301 is coupled to the full-wave rectifier 203 via the input filter 102 and configured to convert the first DC voltage into a second DC voltage and a third DC voltage respectively via the first rectifier 321 and the second rectifier 322. The second DC voltage is applied to the one or more LED arrays 214 via a connection port denoted as "A". The third DC voltage is applied to the battery charging circuit 401 via a connection port denoted as "B". The power switching driver 301 is a step-down converter with the second DC voltage lower than the first DC voltage but higher than the third DC voltage.

In FIG. 1, the battery charging circuit 401 comprises a third diode 433. The third diode 433 configured to control charging and discharging current directions such that a charging current can flow into the rechargeable battery 201 via a connection port denoted as "D" whereas a discharging current can flow from the rechargeable battery 201 into the detection and control circuit 601, further going to the battery-operated driver 501. The battery charging circuit 401 is configured to receive and to regulate the third DC voltage via the connection port denoted as "B" into a fourth DC voltage at the connection port denoted as "D" to charge the rechargeable battery 201 to a battery terminal voltage.

The battery-operated driver 501 is coupled between the detection and control circuit 601 and the one or more LED arrays 214 via connection ports "E" and "F" and configured to convert the battery terminal voltage into a fifth DC voltage to operate the one or more LED arrays 214. The detection and control circuit 601 is configured to send out a control voltage via the connection port "E" and the battery terminal voltage via the connection port "F". The battery-operated driver 501 comprises an input transistor 511 and a constant current driver 521 comprising at least one diode 535. When the control signal from the connection port "E" is a high-level signal voltage, the input transistor 511 is turned on, allowing the battery terminal voltage from the connection port "F" to apply to the constant current driver 521 and to enable the constant current driver 521, which then operates to provide the fifth DC voltage to operate the one or more LED arrays 214 via the connection port "A". The at least one diode 535 in the battery-operated driver 501 and the rectifier 321 in the power switching driver 301 are so configured to avoid voltage crossovers between the second DC voltage and the fifth DC voltage. Hence, the power switching driver 301, the battery-operated driver 501, and the detection and control circuit 601 are configured to auto-select the line voltage from the AC mains or the battery terminal voltage from the rechargeable battery 201 to operate the one or more LED arrays 214 without ambiguity.

In FIG. 1, the detection and control circuit 601 comprises multiple transistor circuits 610 and is configured to enable or disable the battery-operated driver 501 via the input transistor 511. In order for the detection and control circuit 601 to detect the line voltage from the AC mains, the third rectifier 323 in the power switching driver 301 provides a sixth DC voltage via a connection port "C" to the multiple transistor circuits 610. In the detection and control circuit 601, the multiple transistor circuits 610 comprise a second transistor circuit 611 configured to receive the sixth DC voltage. When the line voltage from the AC mains is available, the second transistor circuit 611 pulls down the control voltage via the connection port "E" to the input transistor 511 and consequently disables the constant current driver 521. On the contrary, when the line voltage from the AC mains is unavailable, the sixth DC voltage is not present; the second transistor circuit 611 pulls up the control voltage via the connection port "E" to the input transistor 511 and consequently enables the constant current driver 521. The multiple transistor circuits 610 further comprise a third transistor circuit 621 and a fourth transistor circuit 631. The third transistor circuit 621 and the fourth transistor circuit 631 are coupled between the second transistor circuit 611 and the input transistor 511 in the battery-operated driver 501. The third transistor circuit 621 and the fourth transistor circuit 631 are configured to regulate the battery terminal voltage to deliver to the input transistor 511 and to enable the constant current driver 521 when the control voltage from the connection port "E" is a high-level signal voltage. In other words, the input transistor 511 is configured to receive power from the rechargeable battery 201 and the control voltage from the second transistor circuit 611 to activate the constant current driver 521 when enabled. The third transistor circuit 621 and the fourth transistor circuit 631 comprise a third transistor 622, a fourth transistor 632, at least two resistors 633 and 634, and at least one Zener diode 623, configured to regulate the battery terminal voltage and to balance out the fourth DC voltage, the sixth DC voltage, and the battery terminal voltage for safe and reliable operations of the detection and control circuit 601 and the battery-operated driver 501.

In FIG. 1, the detection and control circuit 601 may further comprise a pair of metal-oxide-semiconductor field-effect transistor (MOSFET) circuits 701 configured to monitor the electric grid and to determine whether the line voltage from the electric grid is available or not. The pair of MOSFET circuits 701 comprise a first MOSFET 711 and a second MOSFET 712, a first resistor 713, a second resistor 714, a capacitor 715, a third operational amplifier 721, a first power supply $V_{CC}$, and a second power supply $V_{DD}$. The first power supply $V_{CC}$ and the second power supply $V_{DD}$ receive power from the rechargeable battery 201 and are configured to operate the first MOSFET 711, the second MOSFET 712, and the third operational amplifier 721 even when the line voltage from the AC mains is unavailable. The pair of MOSFET circuits 701 further comprise two control probes connected to "L" and "N" of the AC mains and is configured to monitor the electric grid and to see if a power outage really occurs. The power outage sometimes needs to be distinguished from power being turned off by a power switch to save energy of the rechargeable battery 201 for emergency use. For example, if the battery-operated driver 501 is enabled with energy in the rechargeable battery 201 being consumed because of the power being turned off, then when the power outage really occurs, the rechargeable battery 210 will fail to operate the battery-operated driver 501 because it is exhausted. The third operational amplifier 721 comprises a reference voltage connected to the second power supply $V_{DD}$. When there is no power outage, a capacitor voltage across the capacitor 715 is charged by the AC mains and kept a high-level signal voltage greater than the reference voltage $V_{DD}$. The third operational amplifier 721 compares the high-level signal voltage with the reference voltage $V_{DD}$ and keeps a high-level signal voltage at its output. The third operational amplifier 721 sends out the high-level signal voltage equivalent to an operating voltage of the pair of MOSFET circuits 701 via the connection port "C", pulling down the second transistor circuit 611 so as to turn off the input transistor 511 and to disable the constant current driver 521 when the line voltage from the electric grid is available. On the other hand, when the line voltage from the electric grid is unavailable, the capacitor voltage across the capacitor 715 is charged by the first power supply $V_{CC}$, discharged through other loads connected to the electric grid, and not kept a high-level voltage greater than the reference voltage $V_{DD}$. The third operational amplifier 721 sends out a low-level signal voltage equivalent to a grounding voltage. The low-level signal voltage is configured to apply to the second transistor circuit 611 to pull up the control voltage to the input transistor 511 and to enable the constant current driver 521.

In FIG. 1, when power is turned off by the power switch with no power outage occurred, the capacitor voltage across the capacitor 715 is charged by the first power supply $V_{CC}$, discharged nowhere, and kept a high-level signal voltage greater than the reference voltage $V_{DD}$. The third operational amplifier 721 compares the high-level signal voltage with the reference voltage $V_{DD}$ and keeps a high-level signal voltage at its output. The third operational amplifier 721 sends out the high-level signal voltage equivalent to an operating voltage of the pair of MOSFET circuits 701 via the connection port "C", pulling down the second transistor circuit 611 so as to turn off the input transistor 511 and to disable the constant current driver 521 when power is turned off by the power switch with the line voltage from the electric grid still available.

Figure 2:
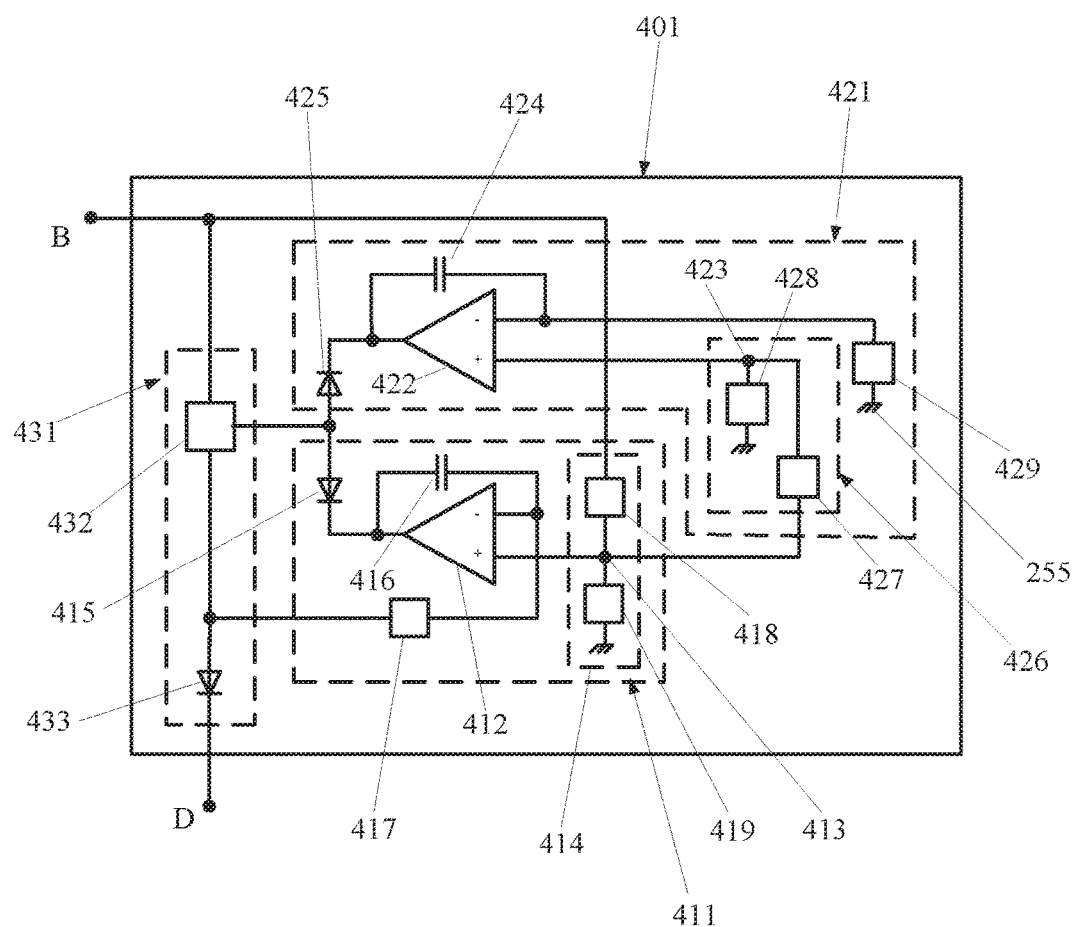
FIG. 2 is an embodiment of a battery charging circuit according to the present disclosure.

FIG. 2 is an embodiment of a battery charging circuit according to the present disclosure. The battery charging circuit 401 comprises a voltage control circuit 411, a current control circuit 421, a first transistor circuit 431, and the second ground reference 255. The battery charging circuit 401 is configured to receive and to regulate the third DC voltage from the connection port denoted as "B" into the fourth DC voltage at the connection port denoted as "D" to charge the rechargeable battery 201 to the battery terminal voltage. In other words, the first transistor circuit 431 is coupled between the third DC voltage at the connection port denoted as "B" and the fourth DC voltage at the connection port denoted as "D" and to regulate a charging current to charge the rechargeable battery 201 to the battery terminal voltage. The first transistor circuit 431 comprises a first transistor 432 and the third diode 433 mentioned in FIG. 1. As depicted in FIG. 1, the third diode 433 is configured to control charging and discharging current directions such that the charging current can flow into the rechargeable battery 201 via the connection port denoted as "D" whereas the discharging current can flow from the rechargeable battery 201 into the detection and control circuit 601, further going to the battery-operated driver 501 without back-flowing into the battery charging circuit 401.

In FIG. 2, the voltage control circuit 411 comprises a first operational amplifier 412, a first voltage reference 413, a first voltage divider 414 coupled to the first operational amplifier 412, a capacitor 416, a resistor 417 coupled between the first transistor 432 and an inverting input of the first operational amplifier 412, and a first diode 415. The first voltage divider 414 comprises two resistors 418 and 419. The voltage control circuit 411 is configured to sample the third DC voltage and the fourth DC voltage and to partially control a charging current flowing into the rechargeable battery 201 via the first transistor circuit 431. The current control circuit 421 comprises a second operational amplifier 422, a second voltage reference 423, a second voltage divider 426 coupled to the second operational amplifier 422, a capacitor 424, a second diode 425, and a resistor 429 coupled between an inverting input of the second operational amplifier 422 and the second ground reference 255. The second voltage divider 426 comprises two resistors 427 and 428 and is coupled between a noninverting input of the second operational amplifier 422 and the noninverting input of the first operational amplifier 412. The current control circuit 421 is configured to partially control a charging current flowing into the rechargeable battery 201 via the first transistor circuit 431.

Figure 3:
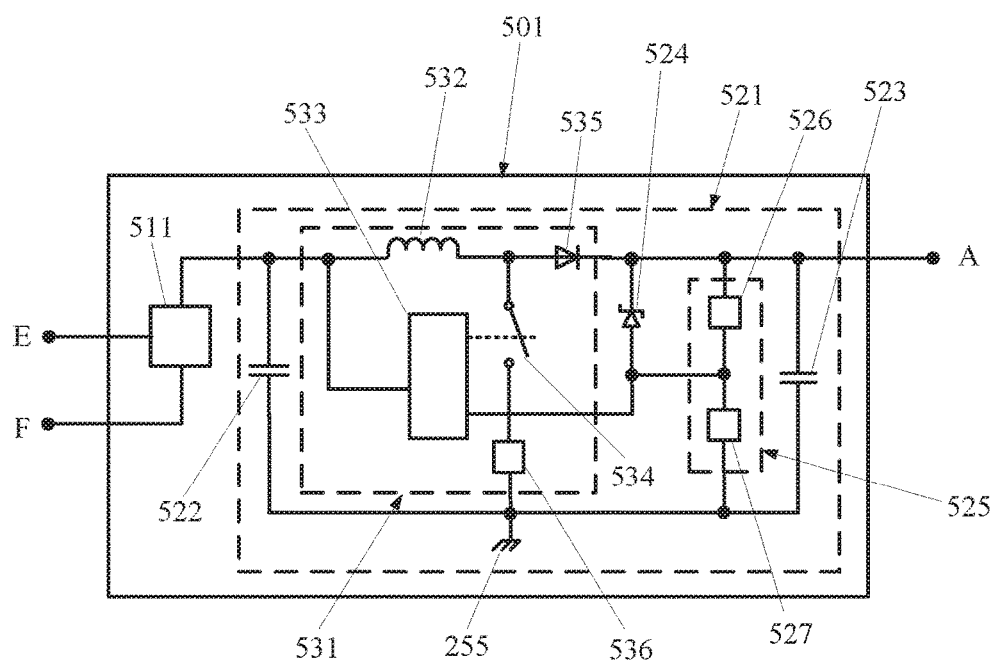
FIG. 3 is an embodiment of a battery-operated driver according to the present disclosure.

FIG. 3 is an embodiment of a battery-operated driver according to the present disclosure. As mentioned above, the battery-operated driver 501 comprises an input transistor 511 and a constant current driver 521 connected to the second ground reference 255 and is configured to convert the battery terminal voltage into the fifth DC voltage to operate the one or more LED arrays 214. The input transistor 511 receives the control voltage via the connection port "E" and the battery terminal voltage via the connection port "F" (also see FIG. 1). When the control voltage is a low-level one, the input transistor 511 is turned off; the battery terminal voltage from the connection port "F" does not apply to the constant current driver 521. However, when the control voltage is a high-level one, the input transistor 511 is turned on; the battery terminal voltage from the connection port "F" applies to the constant current driver 521, immediately enabling the constant current driver 521.

In FIG. 3, the constant current driver 521 is a non-isolated step-up converter with the fifth DC voltage higher than the battery terminal voltage from the rechargeable battery 201 and a forward voltage across the one or more LED arrays 214 to efficiently operate the one or more LED arrays 214 when the line voltage from the AC mains is unavailable. The fifth DC voltage converted from the battery terminal voltage is high enough to properly operate the one or more LED arrays 214 without flickering. The constant current driver 521 further comprises an input capacitor 522, a boost converter 531, an output capacitor 523, a Zener diode 524, a third voltage divider 525 comprising two resistors 526 and 527. The boost converter 531 comprises at least one input inductor 532, a current controller 533, an electronic switch 534, the at least one diode 535 mentioned in FIG. 1, and one or more current sensing resistors 536. The one or more current sensing resistors 536 are configured to control an output current to operate the one or more LED arrays 214 such that the one or more LED arrays 214 consume less power when the line voltage from the AC mains is unavailable than the one or more LED arrays 214 do when the line voltage from the AC mains is available. As mentioned above, the constant current driver 521 is a step-up converter in that the constant current driver 521 transmits power from an input voltage across the input capacitor 522 to an output voltage across the output capacitor 523 in a two-step process. The at least one input inductor 532 is served as an energy storage element. When the electronic switch 534 is closed, the at least one input inductor 532 stores energy with the at least one diode 535 reverse biased to block any current from flowing to the one or more LED arrays 214. In this period, an output voltage is maintained by the output capacitor 523, which is not high enough to operate the one or more LED arrays 214. When the electronic switch 534 is opened, the at least one input inductor 532 reverses its polarity, leading a forward bias of the at least one diode 535. Thus, the output current controlled by the one or more current sensing resistors 536 can flow to replenish the output capacitor 523 and to boost an output voltage at the connection port "A" greater than the input voltage across the input capacitor 522. The at least one diode 535 is further configured to control an output current from the boost converter 531 to flow into the one or more LED arrays 214 via the connection port "A". In this way, the at least one diode 535 is also served to prevent a driving current that drives the one or more LED arrays 214 by the power switching driver 301 from back-flowing into the constant current driver 521.

Whereas preferred embodiments of the present disclosure have been shown and described, it will be realized that alterations, modifications, and improvements may be made thereto without departing from the scope of the following claims. Another kind of schemes with a battery backup control adopted in an LED-based luminaire using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) luminaire, comprising:
   one or more LED arrays;
   a rechargeable battery;
   a full-wave rectifier configured to convert a line voltage from alternate-current (AC) mains into a first direct-current (DC) voltage;
   an input filter configured to suppress an electromagnetic interference (EMI) noise;
   a power switching driver comprising a transformer having a primary side and a secondary side, a first rectifier and a second rectifier on the secondary side of the transformer, and a power factor correction (PFC) and control circuit, the power switching driver coupled to the full-wave rectifier via the input filter and configured to convert the first DC voltage into a second DC voltage and a third DC voltage, respectively, via the first rectifier and the second rectifier;
   a battery charging circuit comprising a voltage control circuit, a current control circuit, and a first transistor circuit, the battery charging circuit configured to receive and regulate the third DC voltage into a fourth DC voltage to charge the rechargeable battery to a battery terminal voltage;
   a battery-operated driver comprising an input transistor and a constant current driver, the constant current driver configured to convert the battery terminal voltage into a fifth DC voltage; and
   a detection and control circuit comprising multiple transistor circuits, the detection and control circuit configured to control the input transistor and to enable or disable the constant current driver, wherein:
the second DC voltage is utilized to operate the one or more LED arrays with a full lumen output when the line voltage from the AC mains is available; and
the fifth DC voltage is utilized to operate the one or more LED arrays with a reduced lumen output relative to the full lumen output when the battery-operated driver is enabled.

2. The LED luminaire of claim 1, wherein the voltage control circuit comprises a first operational amplifier, a first voltage reference, a first voltage divider coupled to the first operational amplifier, and a first diode, the voltage control circuit configured to sample the third DC voltage and the fourth DC voltage and to partially control a charging current flowing into the rechargeable battery via the first transistor circuit.

3. The LED luminaire of claim 1, wherein the current control circuit comprises a second operational amplifier, a second voltage reference, a second voltage divider coupled to the second operational amplifier, and a second diode, the current control circuit configured to partially control a charging current flowing into the rechargeable battery via the first transistor circuit.

4. The LED luminaire of claim 1, wherein the first transistor circuit comprises a first transistor and a third diode connected in series with the first transistor, wherein the first transistor is coupled to the voltage control circuit and the current control circuit, and wherein the first transistor circuit is coupled between the third DC voltage and the fourth DC voltage and to regulate a charging current to charge the rechargeable battery.

5. The LED luminaire of claim 1, wherein the power switching driver further comprises a third rectifier configured to generate a sixth DC voltage to signal that the line voltage from the AC mains is available.

6. The LED luminaire of claim 5, wherein the multiple transistor circuits comprise a second transistor circuit configured to receive the sixth DC voltage and to pull down a control voltage to the input transistor and to disable the constant current driver.

7. The LED luminaire of claim 6, wherein the multiple transistor circuits further comprise a third transistor circuit and a fourth transistor circuit, wherein the third transistor circuit and the fourth transistor circuit are coupled between the second transistor circuit and the input transistor, and wherein the third transistor circuit and the fourth transistor circuit are configured to regulate and to deliver the battery terminal voltage to the input transistor.

8. The LED luminaire of claim 7, wherein the input transistor is configured to further receive a control voltage from the second transistor circuit to activate the constant current driver when enabled.

9. The LED luminaire of claim 8, wherein the third transistor circuit and the fourth transistor circuit comprise at least one Zener diode and at least two resistors, the at least one Zener diode and the at least two resistors configured to regulate the battery terminal voltage and to balance out the fourth DC voltage, the sixth DC voltage, and the battery terminal voltage for safe and reliable operations.

10. The LED luminaire of claim 1, wherein the detection and control circuit further comprises a pair of metal-oxide-semiconductor field-effect transistor (MOSFET) circuits configured to monitor an electric grid and to determine whether the line voltage from the electric grid is available or not, and wherein the pair of MOSFET circuits send out a high-level signal voltage equivalent to an operating voltage of the pair of MOSFET circuits so as to turn off the input transistor and to disable the constant current driver when the line voltage from the electric grid is available.

11. The LED luminaire of claim 10, wherein the pair of MOSFET circuits comprise two MOSFETs, a capacitor, and a third operational amplifier with a reference voltage, wherein the two MOSFETs and the third operational amplifier are configured to receive the battery terminal voltage, wherein the third operational amplifier is configured to compare a voltage across the capacitor to the reference voltage, and wherein the third operational amplifier is configured to send out a low-level signal voltage equivalent to a grounding voltage when the line voltage from the electric grid is unavailable.

12. The LED luminaire of claim 11, wherein the low-level signal voltage is configured to apply to the second transistor circuit to pull up a control voltage to the input transistor and to enable the constant current driver.

13. The LED luminaire of claim 1, wherein the constant current driver comprises a boost converter with the fifth DC voltage higher than the battery terminal voltage and a forward voltage across the one or more LED arrays to operate the one or more LED arrays without flickering.

14. The LED luminaire of claim 1, wherein the constant current driver further comprises at least one inductor and at least one diode coupled to the one or more LED arrays, wherein the first rectifier is coupled to the one or more LED arrays, and wherein the at least one diode and the first rectifier are configured to avoid voltage crossovers between the second DC voltage and the fifth DC voltage.

15. The LED luminaire of claim 1, wherein the power switching driver is a step-down converter with the second DC voltage lower than the first DC voltage but higher than the third DC voltage.

16. The LED luminaire of claim 1, wherein the detection and control circuit further comprises a switch, and wherein when enabled, the switch is configured to allow the rechargeable battery to be charged when the line voltage from the AC mains is available or to be discharged so as to operate the battery-operated driver when the line voltage from the AC mains is unavailable.

* * * * *